United States Patent
Shikata et al.

[11] Patent Number: 5,917,711
[45] Date of Patent: Jun. 29, 1999

[54] DC POWER SUPPLY APPARATUS

[75] Inventors: Kunio Shikata, Minoo; Haruo Moriguchi, Itami; Tetsuro Ikeda, Osaka; Kenzo Danjo, Soraku-gun; Takeshi Omura, Kyoto; Hideo Ishii, Minoo, all of Japan

[73] Assignee: Sansha Electric Manufacturing Company, Limited, Osaka, Japan

[21] Appl. No.: 09/198,420

[22] Filed: Nov. 24, 1998

[30] Foreign Application Priority Data

Nov. 25, 1997 [JP] Japan .................................. 9-340787

[51] Int. Cl.⁶ .................................................. H02M 3/335
[52] U.S. Cl. ................................. 363/16; 363/25; 363/98
[58] Field of Search .................................. 363/16, 17, 24, 363/25, 74, 78, 95, 97, 98, 131, 132, 133, 134

[56] References Cited

U.S. PATENT DOCUMENTS

| 4,468,724 | 8/1984 | Omae et al. ............................ 363/88 |
| 4,810,847 | 3/1989 | Ito ..................................... 219/10.77 |
| 4,876,637 | 10/1989 | Mose et al. ............................ 363/37 |
| 4,964,029 | 10/1990 | Severinsky et al. ..................... 363/80 |
| 4,967,051 | 10/1990 | Maehara et al. ................... 219/10.55 B |
| 4,974,141 | 11/1990 | Severinsky et al. ..................... 363/81 |
| 5,652,547 | 7/1997 | Mokhtar et al. ........................ 330/279 |

*Primary Examiner*—Adolf Deneke Berhane
*Attorney, Agent, or Firm*—William H. Murray

[57] ABSTRACT

DC power supply apparatus includes an input-side rectifier for converting an AC signal from an AC power supply into a DC signal. A DC-to-high-frequency converter converts the DC signal into a high frequency signal in response to a control signal from a control unit. An output-side rectifier converts the high frequency signal into a DC signal and applies it to a load. An input current detector detects an input current flowing through the input-side rectifier and generates a signal representative of the input current. A load current detector detects a load current flowing through the load and generates a signal representative of the load current. The control unit receives the input-current and load-current representative signals, a reference input current signal and a reference load current signal, and provides the DC-to-high-frequency converter with the control signal such that the input-current representative signal can be equal to the reference input current signal and the load-current representative signal can be equal to the reference load current signal.

4 Claims, 2 Drawing Sheets

DC POWER SUPPLY APPARATUS

This application is based on Japanese Patent Application No. HEI 9-340787 filed on Nov. 25, 1997 which is incorporated herein by reference.

This invention relates to power supply apparatus for use with e.g. a plasma arc cutter or an arc welder, or an activating apparatus for a discharge lamp of a projector.

BACKGROUND OF THE INVENTION

Power supply apparatus for e.g. a plasma arc cutter or an arc welder, includes input terminals between which an AC voltage is applied. The AC voltage is rectified by an input-side rectifier and smoothed by a smoothing capacitor, and then converted into a DC voltage. The DC voltage is converted into a high frequency voltage by an inverter. The high frequency voltage is, then, voltage-transformed by a transformer. The transformed high frequency voltage is rectified by an output-side rectifier and, then, applied to a load. In such power supply apparatus, an inverter is used for converting a DC voltage into a high frequency voltage, and, therefore, a small transformer can be used, whereby the power supply apparatus can be downsized as a whole.

When such power supply apparatus is used for e.g. a plasma arc cutter, it has a power factor of e.g. 0.5–0.6 when operated from rated voltage and rated current. The power supply apparatus includes a breaker or fuse coupled to the input terminals thereof for circuit protection. The fuse has an interrupting capacity of e.g. 15 A. Thus, the power supply apparatus allows a maximum of 15 A of current to flow thereinto. Assuming that an input AC voltage is 115 V, an input current is 15 A, the plasma arc cutter has an efficiency of 85%, and the power factor is 0.6, the maximum possible output power P is 880 W. The output voltage of the plasma arc cutter should be e.g. 120 V due to the characteristics of a load coupled thereto. Then, the output current available is about 7.3 A. Thus, the power supply apparatus cannot provide large output current for the input current applied thereto.

Japanese Patent Application No. HEI 8-327642 filed on Nov. 22, 1996, which was published under Japanese Unexamined Patent Publication (KOKAI) No. HEI 10-156537 on Jun. 16, 1998 and corresponds to U.S. patent application Ser. No. 08/968,054, discloses a power supply apparatus, which may solve the above-described problem. In that power supply apparatus, an AC signal is converted into a DC signal by an AC-to-DC converter. The DC signal has its power factor improved by a high power-factor converter. The DC signal with the improved power factor is converted into a high frequency signal by an inverter. The high frequency signal is converted into a DC signal by a high-frequency-to-DC converter and applied to a load. An output current of the high-frequency-to-DC converter is detected by a current detector, and also output power of the high-frequency-to-DC converter is detected by a power detector. When the power supplied to the load is lower than a first preset value, a control unit receives a signal representative of the output current detected by the current detector and controls the inverter such that the output current representative signal becomes equal to a second preset value. When the power supplied to the load is higher than the first preset value, the control unit receives a signal representative of the output power detected by the power detector and controls the inverter such that the output power representative signal becomes equal to the second preset value.

In this power supply apparatus, when there is a large gap between a torch and a workpiece constituting the load, for example, and current flows through the gap, the output voltage and the output current become higher. This causes power higher than the first preset value to be supplied to the torch and the workpiece. Then, the output power representative signal, which represents the higher power, is supplied to the control unit, which controls the inverter in such a manner that the output power becomes constant. Under such constant-power control, as the gap is made smaller, the output current increases and the output voltage decreases. When the power supplied to the torch and the workpiece decreases below the first preset value, the output current representative signal, which represents the increased current, is coupled to the control unit, which, then, controls the inverter in such a manner that the output current is kept constant.

In the power supply apparatus disclosed in Japanese Patent Application No. HEI 8-327642, the control of the inverter is switched between the constant-power control and the constant-current control, and, therefore, the output voltage when the control of the inverter is switched from the constant-power control to the constant-current control can be maintained to be low. As a result, a relatively large current can be supplied to the load under the constant-current control, so that the power supplied to the power supply apparatus can be efficiently used. In addition, the use of the high power-factor converter can improve the power factors of the current and the voltage to be supplied to the inverter to thereby increase the power to be supplied to the load.

In the above-described power supply apparatus, however, the constant-current control is provided when the power supply apparatus operates at the rated voltage and current. Therefore, the power supply apparatus tends to provide a constant output current even when the input voltage is varied. For example, the plasma arc cutter providing an output voltage of 80 V and an output current of 15 A when the input voltage is 100 V and the input current is 15 A tends to keep the output current at 15 A even when the input voltage is varied to 90 V, so that the input current increases to about 16.6 A. When the input voltage is varied to 85 V, the input current increases to 17.6 A. Therefore, the breaker or fuse having an interrupting capacity of 15 A, which is coupled to input terminals of the power supply apparatus, is tripped.

An object of the present invention is to provide power supply apparatus which can keep an input current constant even if an input voltage varies.

SUMMARY OF THE INVENTION

Power supply apparatus according to the present invention is coupled to an AC power supply. The power supply apparatus has an AC-to-DC converter for converting an AC signal from the AC power supply into a DC signal. An output of the AC-to-DC converter is coupled to a DC-to-high-frequency converter. The DC-to-high-frequency converter converts the DC signal applied thereto from the AC-to-DC converter into a high frequency signal in response to a control signal. The DC-to-high-frequency converter is coupled to a high-frequency-to-DC converter which converts the high frequency signal into a DC signal for application to a load. An input current detector detects an input current flowing from the AC power supply into the AC-DC converter and generates a signal representative of the input current. A load current detector detects a load current flowing from the high-frequency-to-DC converter into the load and generates a signal representative of the load current. A reference input current signal source provides a control unit with a reference input current signal representative of a reference input current having a predetermined value. For example, the reference input current signal represents an allowable input current of the power supply apparatus. A reference load current signal source provides the control unit with a reference load current signal representative of a reference load current having a predetermined value. For example, the reference load current signal represents an allowable load current. The control unit receives the input-current representative signal from the input current detector and the load-current representative signal from the load current detector. The control unit provides the DC-to-high-frequency converter with such a control signal as to make the input-signal representative signal equal to the reference input current signal and to make the load-current representative signal equal to the reference load current signal.

The power supply apparatus according to the present invention can keep the input current equal to the reference input current, while providing a constant load current to the load, even if the input voltage decreases, to thereby prevent excessive input current.

In the power supply apparatus, the control unit may comprise a first circuit and a second circuit. The first circuit generates a first signal when the input-current representative signal is greater than the reference input current signal. The second circuit generates a second signal when the sum of the first signal and the load-current representative signal is greater than the reference load current signal. The control unit also comprises a circuit for providing the high-frequency-to-DC converter with such a control signal as to make the second signal zero. The first signal may have a predetermined constant value, for example, a positive constant value. The second signal may represent the difference between the aforementioned sum and the reference load current signal.

The first circuit may comprise a comparator. The second circuit may comprise a summing circuit for summing the first signal and the load-current representative signal to provide a sum signal, and an error amplifier for calculating the difference between the sum signal and the reference load current signal.

The power supply apparatus may include a power-factor improving converter connected between the output of the AC-to-DC converter and the input of the DC-to-high-frequency converter.

The power-factor improving converter makes it possible to keep the input current equal to the reference input current, while providing a constant load current to the load, to thereby prevent excessive input current. In addition, such power supply apparatus can reduce the difference in phase between the input current and the input voltage, so that a sufficiently high load current can be obtained.

DETAILED DESCRIPTION OF PREFERRED EMBODIMENT

Figure 1:
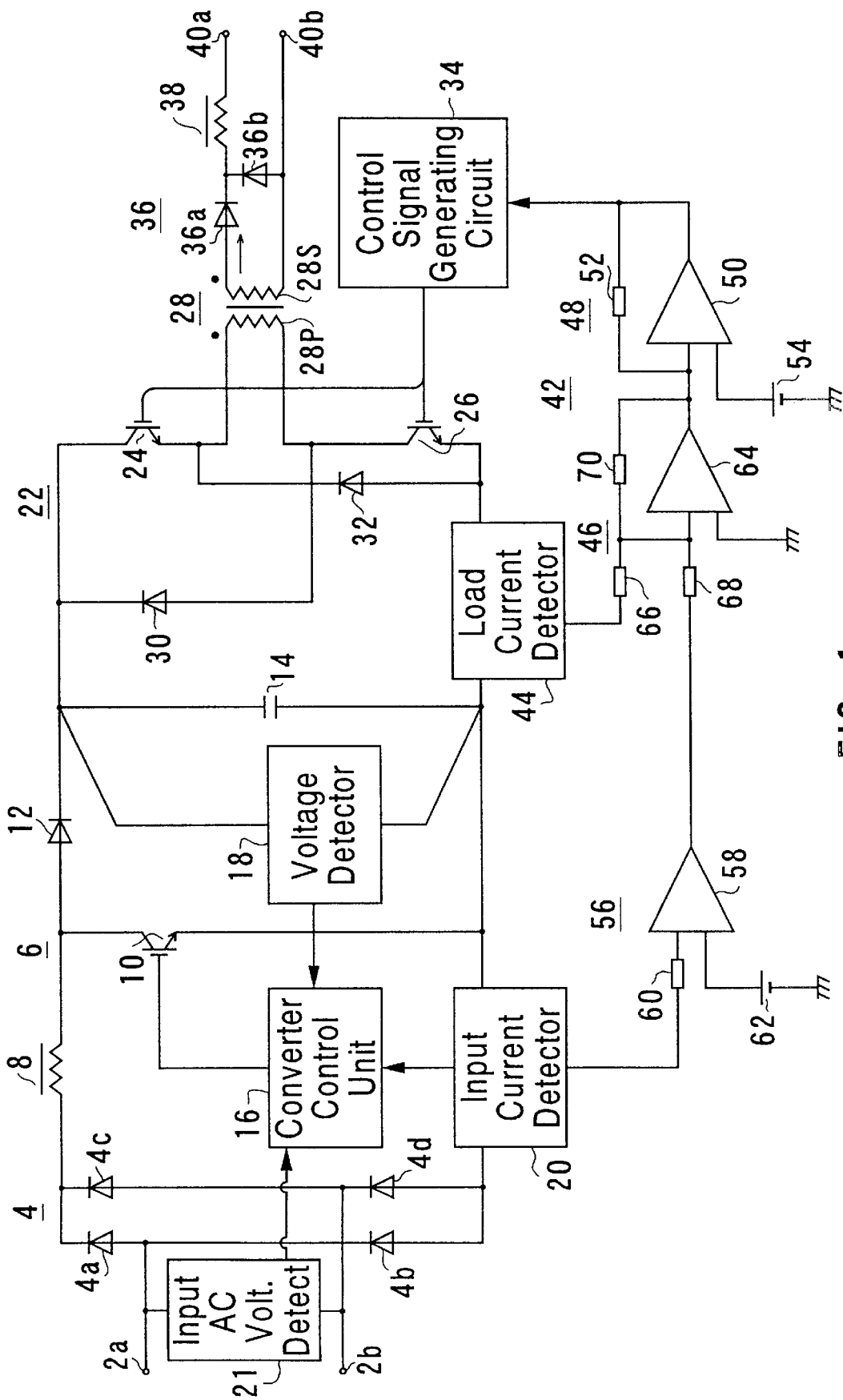
FIG. 1 is a circuit diagram of DC power supply apparatus according to one embodiment of the present invention.

DC power supply apparatus according to one embodiment of the present invention has input terminals 2a and 2b which are adapted to be coupled to a commercial single-phase AC power supply (not shown), as shown in FIG. 1. The input terminals 2a and 2b are coupled to the input of an AC-to-DC converter, e.g. an input-side rectifier 4. The input-side rectifier 4 includes rectifying diodes 4a–4d connected to form a bridge. A node to which the anode of the diode 4a and the cathode of the diode 4b are coupled and a node to which the anode of the diode 4c and the cathode of the diode 4d are coupled provide two input nodes of the input-side rectifier 4 which are coupled to the input terminals 2a and 2b, respectively. A node at which the cathodes of the diodes 4a and 4c are interconnected and a node at which the anodes of the diodes 4b and 4d are interconnected provide two output nodes of the input-side rectifier 4. Between the output nodes, a rectified output signal obtained by full-wave rectification of a commercial AC voltage applied to the input terminals 2a and 2b is developed. The input-side rectifier 4 may be a half-wave rectifier rather than a full-wave rectifier.

The rectified output signal of the input-side rectifier 4 is applied to a power-factor improving converter, e.g. a high power-factor converter 6. The high power-factor converter 6 has a smoothing reactor 8 one end of which is coupled to the node at which the cathodes of the diodes 4a and 4c are interconnected. Between the other end of the smoothing reactor 8 and the node at which the anodes of the diodes 4b and 4d are interconnected, the collector-emitter conduction path of a semiconductor switching element, e.g. an IGBT 10, is coupled. The other end of the smoothing reactor 8 is coupled to one end of a smoothing capacitor 14 via a reverse-current blocking diode 12. The other end of the smoothing capacitor 14 is coupled to the node at which the anodes of the rectifying diodes 4b and 4d are interconnected.

The IGBT 10 is ON/OFF controlled by a converter control unit 16. For that purpose, a voltage detector 18 is connected across the smoothing capacitor 14 to detect a voltage developed across the capacitor 14, and a signal representative of the detected voltage is applied to the converter control unit 16. The current flowing in the high power-factor converter 6, i.e. the input current of the power supply apparatus, is detected by an input current detector 20, which is connected between the junction of the anodes of the diodes 4b and 4d and the other end of the capacitor 14. A signal representative of the input current is applied to the converter control unit 16.

The converter control unit 16 provides an error signal representative of the difference between the detected-voltage representative signal and a reference signal corresponding to a voltage predetermined as an output voltage of the high power-factor converter 6. The converter control unit 16 also detects a difference in phase between the input AC voltage applied to the input terminals 2a and 2b and the input current in accordance with a signal representative of the input AC voltage detected by an input AC voltage detector 21 connected between the input terminals 2a and 2b and the input-current representative signal, and produces a signal representative of the detected phase difference. The converter control unit 16 multiplies the phase-difference representative signal and the error signal together, and ON/OFF controls the IGBT 10 in such a manner that the product becomes zero. The aforementioned predetermined output voltage of the high power-factor converter 6 is selected at a value higher than an input voltage to the high power-factor converter 6, so that the high power-factor converter 6 functions also as a voltage-boosting converter.

An output signal of the high power-factor converter 6 is applied to a DC-to-high-frequency converter 22 provided by, for example, a forward-type switching regulator comprising two semiconductor elements. Specifically, the converter 22 includes two semiconductor switching elements, e.g. IGBTs 24 and 26 having their collector-emitter conduction paths connected in series through a primary winding 28P of a transformer 28. The collector of the IGBT 24 is connected to the cathode of a diode 30. The anode of the diode 30 is connected to the collector of the IGBT 26. The emitter of the IGBT 24 is connected to the cathode of a diode 32, and the anode of the diode 32 is connected to the emitter of the IGBT 26.

The IGBTs 24 and 26 are made conductive or nonconductive simultaneously in response to a control signal applied thereto from a control signal generating circuit 34. For example, when the IGBTs 24 and 26 are conductive, current flows in the primary winding 28P of the transformer 28, and, accordingly, current flows in a secondary winding 28S of the transformer 28 in the direction shown by an arrow in FIG. 1. When both the IGBTs 24 and 26 are simultaneously turned off, current flows in the secondary winding 28S in the direction opposite to the arrow so as to maintain the magnetic flux which has been supplied from the primary winding 28P to the secondary winding 28S of the transformer 28. This causes an AC current to flow in the secondary winding 28S. Thus, by turning on and off the IGBTs 24 and 26 at a high rate, a high frequency current is caused to flow in the secondary winding 28S. The magnitude of the high frequency current is adjusted by the control signal from the control signal generating circuit 34.

The secondary winding 28S of the transformer 28 is connected to a high-frequency-to-DC converter, e.g. an output-side rectifier 36. The rectifier 36 includes diodes 36a and 36b the cathodes of which are interconnected. The anode of the diode 36a is connected to one end of the secondary winding 28S and the anode of the diode 36b is connected to the other end of the secondary winding 28S. The diode 36a rectifies the current flowing in the direction shown by the arrow, and the diode 36b rectifies the current flowing the direction opposite to the arrow. A DC current obtained by such rectification is smoothed by a smoothing reactor 38, and supplied from output terminals 40a and 40b to a load (not shown), e.g. between a torch and a workpiece of a plasma arc cutter.

The control signal generating circuit 34 constitutes a part of a control unit 42. The control unit 42 has a load current detector 44 for detecting current flowing in the DC-to-high-frequency converter 22, which current corresponds to a load current to be supplied from the DC power supply apparatus to the load. A signal representative of the load current detected by the load current detector 44 is applied to an error amplifier circuit 48 through a summing circuit 46 which will be described below. The error amplifier circuit 48 includes an operational amplifier 50, and a feedback resistor 52 coupled between a first input terminal and an output terminal of the operational amplifier 50. The first input terminal of the operational amplifier 50 receives an output signal of the summing circuit 46.

The other input terminal of the operational amplifier 50 receives from a variable reference load current signal source 54 a reference load current signal corresponding to a predetermined load current of e.g. 15 A. Without the summing circuit 46, an error signal representative of the difference between the load-current representative signal and the reference load current signal would be generated by the error amplifier circuit 48 and applied to the control signal generating circuit 34. The control signal generating circuit 34 generates such a control signal as to make the error signal zero. That is, the IGBTs 24 and 26 are controlled so that the load current can become equal to the reference load current. In other words, the constant-current control is provided.

Assuming that when the voltage applied to the input terminals 2a and 2b has a certain value, the load current is of 15 A, for example, the constant-current control makes the input current increase above 15 A so as to maintain the load current at 15 A when the voltage applied to the input terminals 2a and 2b becomes lower than the certain value. If a breaker or fuse (not shown) disposed between the input terminals 2a and 2b and the AC power supply has a rated value of 15 A, the input current larger than 15 A causes tripping of the breaker or melting of the fuse.

To solve such problem, the DC power supply apparatus of the present invention has a comparator circuit 56 to which the input-current representative signal from the input current detector 20 is applied. Specifically, the comparator circuit 56 has an operational amplifier 58 having one input terminal to which the input-current representative signal is applied through a resistor 60. The other input terminal of the operational amplifier 58 is supplied with a reference input current signal from a reference input current signal source 62. The reference input current signal corresponds to the input current of e.g. 15 A. The operational amplifier 58 provides a first signal, e.g. a signal having a predetermined positive constant value, when the input-current representative signal is higher than the reference input current signal. The operational amplifier 58 does not provide any signal or provides a zero output when the input-current representative signal is equal to or lower than the reference input current signal.

The signal from the operational amplifier 58 is applied to the summing circuit 46. The summing circuit 46 comprises an operational amplifier 64 having a first input terminal to which the load-current representative signal is applied from the load current detector 44 through a resistor 66. The first input terminal is also supplied with an output signal of the comparator circuit 56 via a resistor 68. A feedback resistor 70 is connected between the first input terminal and an output terminal of the operational amplifier 64.

The other or second input terminal of the operational amplifier 64 is grounded. At the output terminal of the operational amplifier 64, the load-current representative signal only is developed when the input current is equal to or less than 15 A. When the input current is higher than 15 A, a sum signal representative of the sum of the load-current representative signal and the constant value signal from the comparator circuit 56 is developed at the output terminal of the operational amplifier 64. The sum signal is applied to the error amplifier circuit 48 as described previously.

Thus, when the input current is higher than 15 A, the error amplifier circuit 48 applies an error signal representative of the difference between the output signal of the summing circuit 46 and the reference load current signal (which error signal is greater than when the input current is lower than 15 A) to the control signal generating circuit 34. Then, the control signal generating circuit 34 controls the IGBTs 24 and 26 in such a manner that the error signal becomes zero.

Figure 2:
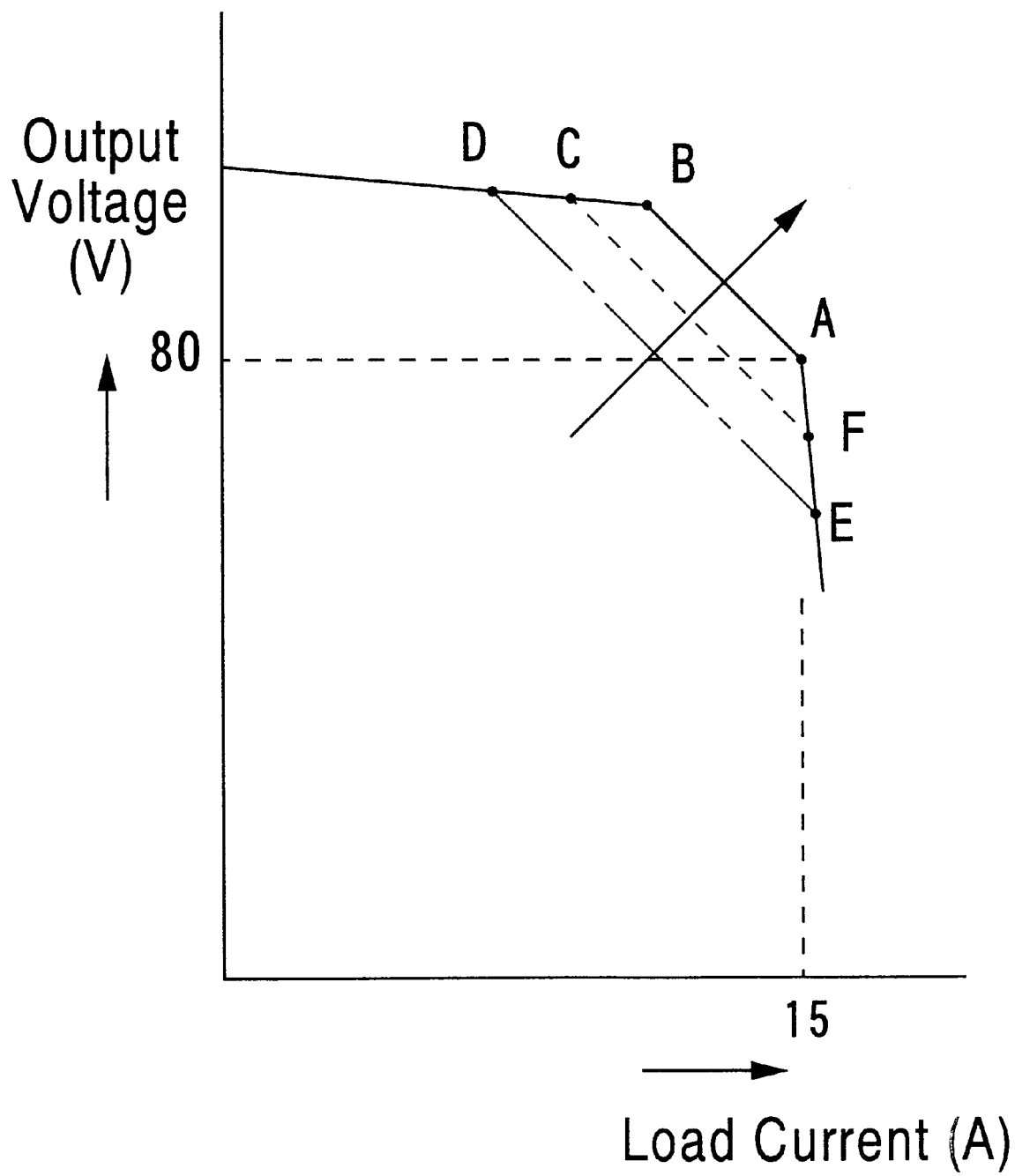
FIG. 2 shows an output voltage vs. load current characteristic of the DC power supply apparatus of FIG. 1.

FIG. 2 shows a static characteristic of the output voltage with respect to the load current when the load of the DC power supply apparatus is a resistor. For example, when the input AC voltage is of 100 V, and the load current is increased from zero by increasing the reference load current signal, the output voltage gradually decreases from the voltage provided under no-load condition. When the input current becomes higher than 15 A at a point B shown in FIG. 2, for example, the comparator circuit 56 provides the constant value signal, and the control signal generating circuit 34 controls the IGBTs 24 and 26 in such a manner as to prevent the aforementioned constant value signal from being developed, to thereby keep the input current at 15 A.

Since the input voltage is constant at 100 V, and the input current is kept at 15 A, the output voltage gradually decreases as the reference load current signal increases. When the load current becomes 15 A, the output voltage assumes a value of e.g. 80 V, which is commensurate with the load current of 15 A, at a point A shown in FIG. 2. Thereafter, the constant-current control is provided.

When the input voltage of e.g. 85 V is applied, the input current becomes 15 A at a point D shown in FIG. 2. The output voltage begins to decrease at a point D, at which the load current is lower than at the point A. Then, the load current becomes constant at a point E, at which the output voltage is lower than at the point A. The gradient of a line connecting the points D and E is almost equal to that of a line connecting the points B and A.

When the input voltage of 95 V is applied, the input current becomes 15 A at a point C, which is between the points B and D. The output voltage begins to decrease at the point C, and, then, the load current becomes constant at a point F, at which the output voltage is between the voltages at the points A and E. The gradient of a line connecting the points C and F is almost equal to that of the line connecting the points B and A.

Under such control, when the DC power supply apparatus is operating, for example, at the point A, where the input voltage is 100 V and the input and load currents are both 15 A, a change of the input voltage to 85 V or 95 V causes the output voltage to decrease with the input and load current kept almost unchanged, up to the point E or F. Since the input current is kept at 15 A, the breaker or fuse is prevented from being tripped or melting.

In the above-described embodiment, the DC power supply apparatus uses a two-transistor forward-type switching regulator circuit as the DC-to-high-frequency converter 22. However, a one-transistor forward-type switching regulator circuit or an inverter circuit may be used instead. The high power-factor converter 6 may be omitted from the DC power supply apparatus. A three-phase commercial AC power supply may be used in place of the single-phase commercial AC power supply. Also, the comparator circuit 56 may be replaced by an error amplifier, and the error amplifier circuit 48 may be replaced by a comparator.

In the above-described embodiment, the reference input current and the reference load current are both at 15 A. But, the reference load current may be lower than the reference input current. The load current detector 44, which is disposed on the input-side of the DC-to-high-frequency converter 22 in the described embodiment, may be connected between the output terminal 40*a* and the smoothing reactor 38, or between the output terminal 40*b* and the anode of the diode 36*b*. The input current detector 20 may be disposed on the input-side of the input-side rectifier 4.

What is claimed is:

1. DC power supply apparatus comprising:
   an AC-to-DC converter adapted to be coupled to an AC power supply for converting an AC signal supplied from said AC power supply into a first DC signal;
   a DC-to-high-frequency converter coupled to an output of said AC-to-DC converter and responsive to a control signal for converting said first DC signal into a high frequency signal;
   a high-frequency-to-DC converter coupled to said DC-to-high-frequency converter for converting said high frequency signal into a second DC signal for application to a load;
   an input current detector for generating a signal representative of an input current flowing from said AC power supply into said AC-to-DC converter;
   a load current detector for generating a signal representative of a load current flowing from said high-frequency-to-DC converter into said load;
   a reference input current signal source for providing a reference input current signal representative of a reference input current having a predetermined value;
   a reference load current signal source for providing a reference load current signal; and
   a control unit receiving said input-current representative signal and said load-current representative signal from said input current detector and said load current detector, respectively, and receiving said reference input current signal and said reference load current signal, for supplying said DC-to-high-frequency converter with such a control signal as to make said input-current representative signal equal to said reference input current signal and to make said load-current representative signal equal to said reference load current signal.

2. The DC power supply apparatus according to claim 1 wherein said control unit comprises:
   a first circuit for generating a first signal when said input-current representative signal is greater than said reference input current signal;
   a second circuit for generating a second signal when the sum of said first signal and said load-current representative signal is greater than said reference load current signal; and
   a circuit for providing said high-frequency-to-DC converter with such a control signal as to make said second signal zero.

3. The DC power supply apparatus according to claim 2 wherein said first circuit is a comparator for providing said first signal having a positive constant value when said input-current representative signal is greater than said reference input current signal; and
   said second circuit comprises a summing circuit for summing said first signal and said load-current representative signal, and an error amplifier for providing, as the second signal, an error signal representative of the difference between an output signal of said summing circuit and said reference load current signal.

4. The DC power supply apparatus according to claim 1 wherein a power-factor improving converter is disposed between an output of said AC-to-DC converter and an input of said DC-to-high-frequency converter.

* * * * *